US008004538B2

(12) United States Patent
Alessi et al.

(10) Patent No.: US 8,004,538 B2
(45) Date of Patent: Aug. 23, 2011

(54) PREFERENTIAL TONE SCALE FOR ELECTRONIC DISPLAYS

(75) Inventors: Paula J. Alessi, Rochester, NY (US); Christopher J. White, Avon, NY (US)

(73) Assignee: Global OLED Technology LLC, Herndon, VA (US)

( * ) Notice: Subject to any disclaimer, the term of this patent is extended or adjusted under 35 U.S.C. 154(b) by 991 days.

(21) Appl. No.: 11/859,579

(22) Filed: Sep. 21, 2007

(65) Prior Publication Data

US 2009/0079753 A1 Mar. 26, 2009

(51) Int. Cl.
*G09G 5/02* (2006.01)
(52) U.S. Cl. ......... 345/591; 345/589; 345/593; 345/594
(58) Field of Classification Search ............. 345/589, 345/591, 593, 594
See application file for complete search history.

(56) References Cited

U.S. PATENT DOCUMENTS

| | | | |
|---|---|---|---|
| 5,447,811 A | | 9/1995 | Buhr et al. |
| 6,370,265 B1* | | 4/2002 | Bell et al. .................. 382/132 |
| 6,850,259 B1* | | 2/2005 | Rzepkowski et al. ........ 715/835 |
| 2004/0057632 A1* | | 3/2004 | Gindele ..................... 382/274 |
| 2005/0100242 A1* | | 5/2005 | Trifonov et al. ............. 382/274 |
| 2005/0117186 A1* | | 6/2005 | Li et al. ...................... 359/15 |
| 2005/0117799 A1* | | 6/2005 | Fuh et al. ................... 382/169 |
| 2005/0123193 A1* | | 6/2005 | Lamberg et al. ............ 382/167 |
| 2005/0244072 A1* | | 11/2005 | Imai ........................ 382/254 |
| 2007/0081721 A1* | | 4/2007 | Xiao et al. ................. 382/167 |

(Continued)

FOREIGN PATENT DOCUMENTS

EP  0 971 315 A2  1/2000

(Continued)

OTHER PUBLICATIONS

BS EN 61966-2-1:2000 IEC 61966-2-1:1999 Incorporating Amendment No. 1; Multimedia Systems and Equipment-Colour Measurement and Management—Part 2-1: Colour Management-Default RGB Colour Space-sRGB; pp. 1-40.

(Continued)

*Primary Examiner* — Daniel F Hajnik
*Assistant Examiner* — Jeffrey Chow
(74) *Attorney, Agent, or Firm* — Morgan, Lewis & Bockius LLP

(57) ABSTRACT

A method of displaying on a display a visual reproduction of an original scene with a preferential tone mapping; said display having a selected display white point and a selected display black point separated by more than 3.5 decades of luminance; the method comprising the steps of capturing original scene parameters, performing a transformation on said captured scene parameters, and displaying a visual reproduction of the scene on the display from the transformed captured scene parameters; wherein said transformation, taken in conjunction with untransformed characteristics of the capturing and displaying steps, results in a reproduced tone mapping having: a. a dynamic range greater than 3.5 decades; b. a first derivative value of minus log reproduced luminance relative to log original scene luminance between −1.1 and −1.51 inclusive for a log scene luminance of −0.6, measured relative to a 100% diffuse reflector in the original scene; c. a first derivative value less than or equal to −1.9 and greater than −4.0 for a log scene luminance of −1.9; d. a first derivative value between −1.5 and −3.0 inclusive for a log scene luminance of −2.0; and e. a first derivative value at a log scene luminance of −2.5 greater than the first derivative value at a log scene luminance of −2.0.

17 Claims, 6 Drawing Sheets

U.S. PATENT DOCUMENTS

2007/0237392 A1* 10/2007 Ohara .......................... 382/171

FOREIGN PATENT DOCUMENTS

| | | |
|---|---|---|
| EP | 1 199 882 A2 | 4/2002 |
| EP | 1 400 921 A2 | 3/2004 |
| WO | WO 2005/101309 A1 | 10/2005 |

OTHER PUBLICATIONS

R. W. G. Hunt; *The Reproduction of Colour in Photography, Printing & Television*; 1987; Fourth Edition; Chapter 6; "Tone Reproduction"; pp. 49-68.

* cited by examiner

PREFERENTIAL TONE SCALE FOR ELECTRONIC DISPLAYS

FIELD OF THE INVENTION

The present invention relates to tone reproduction in electronic displays.

BACKGROUND OF THE INVENTION

Additive color digital image display devices are well known and are based upon a variety of technologies such as cathode ray tubes, liquid crystal modulators, and solid-state light emitters such as Organic Light Emitting Diodes (OLEDs). In a common OLED color display device, a pixel includes red, green, and blue colored OLEDs. These OLEDs are color primaries that define a color gamut. By additively combining the illumination from each of these three OLEDs, i.e. with the integrative capabilities of the human visual system, a wide variety of colors can be achieved. However, it is not enough to simply provide an image. Displays are intended to provide a realistic representation of the images to the viewer, and there can be a need to correct display tonal responses to enhance the display image quality. The tonal enhancement must be implemented in the display's imaging chain.

The relationship between the reproduced luminances of objects in an image scene reproduction compared to the original scene luminances of those objects is a critical aspect of achieving viewer satisfaction with the reproduction. The theoretically correct reproduction for this purpose is a one-to-one relationship between the luminances of the original scene and the luminances of the reproduction only if the conditions under which the reproduction is viewed are identical to the conditions under which the original scene was viewed. This is described in the book "The Reproduction of Colour" by Dr. R. W. G. Hunt, (Fountain Press, England—Fourth Ed.), specifically in Chapter 6 wherein the fundamentals of tone reproduction are discussed.

In reality, displays showing reproductions of original scenes are viewed under conditions deviating significantly from the conditions under which the actual scenes are viewed. Consequently, actual tone reproduction produced by practical image reproduction systems must deviate significantly from a one-to-one relationship. In many instances, the preferred visual reproduction does not correspond to that matching the original scene most closely. The challenge in image scene reproduction, therefore, is to reproduce the original scene in such a manner that upon viewing the reproduction, the viewer has the impression of looking at the original scene. That is, viewing the reproduction should inspire in the viewer the same response as if viewing the original scene. The reproduction will thus appear natural to the viewer even though it may not be exactly faithful to the original scene, i.e. may not be an exact one-to-one luminance mapping relationship between the original scene and the reproduction. The result would then be a pleasing reproduction that would be preferred over reproductions not conveying that impression.

As is known in the art, the conditions under which an original scene or a display showing a reproduction of a scene are viewed can be characterized by a number of parameters, including illuminance on the scene or the display and surrounding illumination. Viewing conditions are typically further characterized by parameters of the major sources illuminating the scene or display. These include position of the sources, their chromaticity and illuminance, and their emission patterns (for example, specular or diffuse). One useful way of summarizing some of these parameters is by characterizing viewing flare: the amount of illumination not generated by a display which the user sees while viewing the display. This can include light reflected off the display from sources in the viewing environment, and light internally reflected within the display (i.e. optical crosstalk).

One example of a tone-reproduction standard is sRGB, described in IEC 61966-2.1:1999+A1.2003 Multimedia systems and equipment—Colour measurement and management—Part 2-1: Colour management—Default RGB colour space—sRGB, Version 1.10, Nov. 5, 1996. This standard attempts to account for the viewing conditions of a typical office environment. This is shown as system tonescale curve 170a in FIG. 3. This curve covers a reproduced luminance dynamic range of 3.5 decades over a three-decade range of scene luminance, which is typical for a CRT display.

Relative to previous displays, OLED displays provide a greater dynamic range that has not been used in previous tone-mapping methods such as sRGB. It is desirable, therefore, to provide an image reproduction system and method that offers an overall tone mapping in the reproduced image, as seen by the viewer, that is perceived to be a natural reproduction of the original scene while utilizing the full display dynamic range.

SUMMARY OF THE INVENTION

It is therefore an object of the present invention to provide a display tonescale that encompasses the full dynamic range of recent displays, and can provide pleasing images for a variety of viewing environments.

This object is achieved by a method of displaying on a display a visual reproduction of an original scene with a preferential tone mapping; said display having a selected display white point and a selected display black point separated by more than 3.5 decades of luminance; the method comprising the steps of capturing original scene parameters, performing a transformation on said captured scene parameters, and displaying a visual reproduction of the scene on the display from the transformed captured scene parameters; wherein said transformation, taken in conjunction with untransformed characteristics of the capturing and displaying steps, results in a reproduced tone mapping having:

a. a dynamic range greater than 3.5 decades;

b. a first derivative value of minus log reproduced luminance relative to log original scene luminance between $-1.1$ and $-1.51$ inclusive for a log scene luminance of $-0.6$, measured relative to a 100% diffuse reflector in the original scene;

c. a first derivative value less than or equal to $-1.9$ and greater than $-4.0$ for a log scene luminance of $-1.9$;

d. a first derivative value between $-1.5$ and $-3.0$ inclusive for a log scene luminance of $-2.0$; and e. a first derivative value at a log scene luminance of $-2.5$ greater than the first derivative value at a log scene luminance of $-2.0$.

ADVANTAGES

It is an advantage of this invention that it provides pleasing system tonescale reproduction in an electronic display while providing a large dynamic range, which can be particularly applicable to OLED displays. It is a further advantage of this invention that it provides good detail in blacks and dark colors it is a further advantage of this invention that it provides the above advantages under a variety of viewing environments. It is a further advantage of this invention that it is applicable to a variety of display technologies.

DETAILED DESCRIPTION OF THE INVENTION

Figure 1:
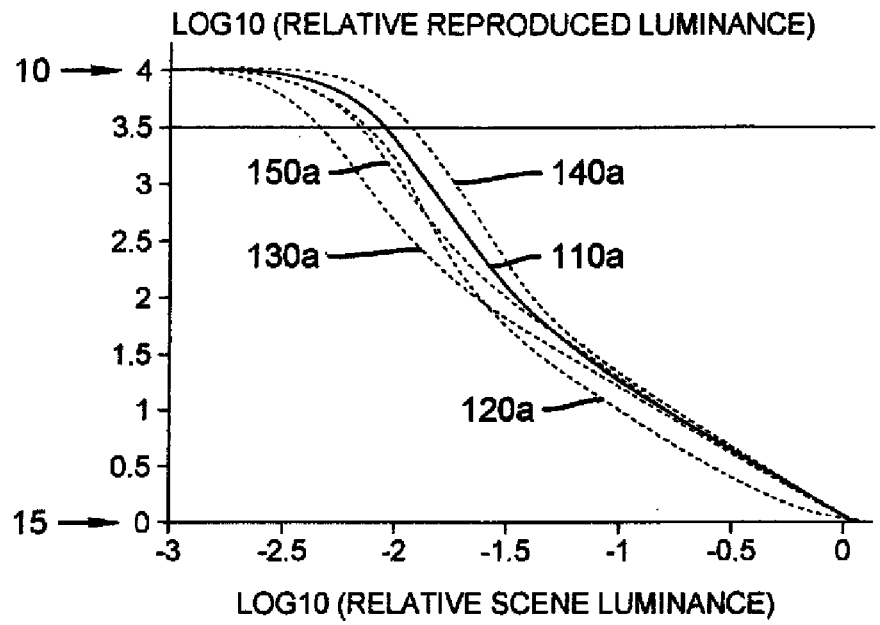
FIG. 1 shows a set of display system tonescale curves according to this invention, which account for different viewing environments.
Figure 2:
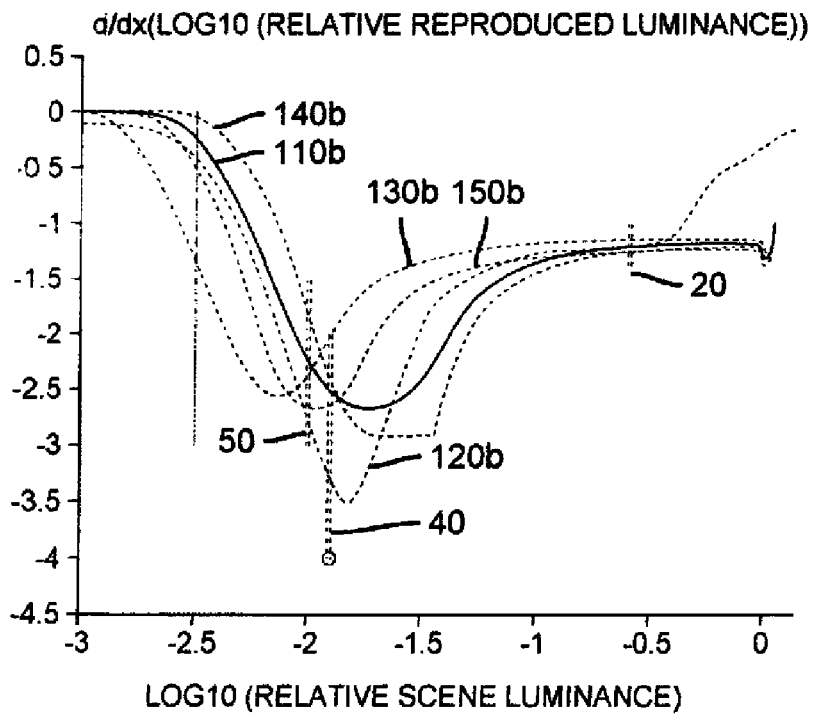
FIG. 2 shows the first derivative of the curves of FIG. 1.

FIG. 1 shows a set of display system tonescale curves according to this invention, which are designed for different viewing conditions. FIG. 2 shows the first derivatives of the curves of FIG. 1. The abscissa of the system tonescale curve is the base-10 logarithm of the scene luminance relative to a 100% diffuse reflector in the original scene. The ordinate of the system tonescale curve is the negative base-10 logarithm of the reproduced luminance relative to the display white point 15.

FIGS. 1 and 2 show the preferential tone mapping for reproduction of an original scene on a display that has a selected display white point 15 and selected display black point 10 that are separated by more than 3.5 decades, or orders of magnitude, of reproduced (display) luminance. The display can be an OLED, LCD, or plasma display. An OLED display in particular can have a reproduced luminance dynamic range of four decades or orders of magnitude. As shown in FIG. 1, the system tonescale has a dynamic range of greater than 3.5 decades for reproduced luminance from black point 10 to white point 15. This allows the tonescale to take full advantage of the dynamic range of the display. As will be seen, system tonescale curves 110a, 120a, 130a, 140a, and 150a are some representative embodiments of reproduced tone mapping in accordance with this invention. They represent an envisioned range of tone mapping curves for a display under different conditions to be described herein. Such conditions can include variations in the amount of light in the viewing environment, characteristics of the display such as surface reflectivity, and characteristics of the scene to be displayed, such as the luminance range of the scene. The different curves include different levels of flare correction and different slope characteristics, and the optimum curve to use for a display depends upon the conditions.

Viewing flare, as described above, adds light uniformly to the displayed image, which means that on a relative basis it brightens dark colors more than light colors. The overall effect is to reduce the contrast of the reproduced image. A system tonescale can provide pleasing images in the presence of viewing flare using greater contrast or an additive flare correction. System tonescale curve 130a can be a preferential tone mapping for a dark room in which there is relatively little viewing flare. System tonescale curve 110a can be a prefer-ential tone mapping in the presence of some viewing flare, e.g. a living room with average lighting. System tonescale curve 140a can be a preferential tone mapping when the viewing flare is very great, e.g. a brightly lit showroom.

FIG. 2 shows first derivative curves and restrictions on the first derivative of the reproduced tone mapping. The curves are the first derivative of the similarly numbered curve in FIG. 1, e.g. first derivative curve 110b is the first derivative of system tonescale curve 110a, etc. At a log scene luminance of −0.6, as measured relative to a 100% diffuse reflector in the original scene, the value of the first derivative of minus log reproduced display luminance (the vertical axis of FIG. 2) relative to log original scene luminance (the horizontal axis) is between −0.1 and −1.51, inclusive (shown by the vertical extent of limit 20) and desirably between −1.21 and −1.27, inclusive. This restriction allows good detail in highlights and light colors while not sacrificing the display's dynamic range. At a log scene luminance of −1.9, the first derivative value is less than or equal to −1.9 and greater than −4.0, (shown by the vertical extent of limit 40). At a log scene luminance of −2.0, the first derivative value is between −1.5 and −3.0, inclusive (shown by the vertical extent of limit 50). These two restrictions mean that there will be sufficient contrast in the dark colors and shadow regions of the image. At a log scene luminance of −2.5, the first derivative value is greater (less negative) than the first derivative value at a log scene luminance −2.0. This restriction prevents the contrast from being excessive in the very dark colors of the image, which helps assure that shadow detail in images will be maintained.

There are further preferred criteria to improve the tone mapping. The first derivative preferably should have a value greater than −4.0 for all log scene luminances. For log scene luminances less than −2.0 and log scene luminances greater than −1.5, the first derivative value preferably should be greater than −3.0. This puts a limit on the allowable contrast of the display in this region, which increases the detail in reproduced dimly-lit images. Images with mid-scale to dark colors, like dark skin tones, will also have increased detail making them a more pleasing reproduction of the original scene. The first derivative further preferably should have a value greater than −0.5 for log scene luminances less than −2.8, as shown in FIG. 2. This will assure good shadow detail. Further, the first derivative of the reproduced tone mapping preferably should be continuous for log scene luminances greater than −3 and less than zero, as shown in FIG. 2. This will prevent objectionable contouring due to instantaneous slope changes. For some curves, e.g. those accounting for high amounts of viewing flare, it is further desirable that the first derivative value for a log scene luminance of −2.0 is greater than that for a log scene luminance of −1.9, as shown in FIG. 2 by curves 110b, 120b, and 140b. This causes the system tonescale curve (FIG. 1) to be rounded at the top, and prevents excess low-end contrast, which is visually objectionable. It is further desirable that the second derivative of the reproduced tone mapping is continuous for log scene luminances greater than −3 and less than zero. This will reduce the likelihood of objectionable contouring in extreme cases. This condition is fulfilled by the derivatives of curves 110b, 130b, and 150b of FIG. 2. It is further desirable that the reproduced tone mapping have a first derivative value for a log scene luminance of zero greater than the value for a log scene luminance of 0.6. This increases detail information in the scene highlights.

The reproduced tone mapping to be used under a given set of conditions can be selected based on several criteria. One of the criteria can be the characteristics of the viewing environment, which can include factors such as surrounding illumination, viewing flare, surrounding illumination color, or illumination type (e.g. specular or diffuse).

Another of the criteria can be the characteristics of the display, which can include factors such as display reflectivity and polarization. Another factor, ambient contrast ratio, is a characteristic of both the environment and the display. As described above, flare can come from ambient light in the viewing environment, or light reflected from the face of the display, or both. The selection of reproduced tone mapping can provide pleasing images in the presence of flare. Thus, when a display has a relatively high surface reflectivity, a tone mapping should be selected that compensates for flare, e.g. system tonescale curve 140a, which has a first derivative minimum at a higher log scene luminance, e.g. about −1.5 as shown by curve 140b in FIG. 2. For a display with a relatively lower surface reflectivity, a tone mapping with less compensation for flare should be selected, e.g. system tonescale curve 110a or 130a. The log scene luminances of the first derivative minimums for all of the curves of FIG. 2 are shown in Table 1, below. Such curves 110a and 130a have a first derivative minimum at a relatively lower scene luminance in comparison to that of curve 140a, e.g. log scene luminance of about −1.7 for curve 110b, or about −2.1 for curve 130b.

Similarly, when the reproduced tone mapping to be used is selected based on the characteristics of the viewing environment, one would select a reproduced tone mapping with a first derivative minimum at a relatively higher scene luminance, e.g. system tonescale curve 140a, when the display is viewed in the presence of a relatively greater amount of ambient light falling on the face of the display; and one would select a reproduced tone mapping with a first derivative minimum at a relatively lower scene luminance, e.g. system tonescale curve 110a or 130a, when the display is viewed in the presence of a relatively lesser amount of ambient light falling on the display. The exact preferred curve to select will depend upon a combination of the viewing conditions and the properties of the display, including the surface reflectivity, and can be determined by those skilled in the art. The surface reflectivity of the display is determined by the display's construction. Many techniques for lowering surface reflectivity are known in the art, including circular polarizers, black matrix, and anti-reflective coatings.

The reproduced tone mapping to use for the display can also be selected based on characteristics of the original scene to be displayed. Such characteristics can include scene luminance variation, highlight levels, and average luminance of the scene. For example, a scene in fog will have a small scene luminance variation and can look flat to the viewer. This can be adjusted to provide a more pleasing image to the viewer by selecting a curve with a different first derivative at a log scene luminance of −0.4. A reproduced tone mapping with a relatively more negative first derivative at log scene luminance −0.4 (that is, the contrast of the system tonescale curve of FIG. 1 is greater at log scene luminance −0.4) can be used when displaying a reproduction of an original scene having a relatively lower luminance variation across the scene. When displaying a reproduction of an original scene having a relatively higher luminance variation across the scene, e.g. a scene with bright sunlight and shadows, a reproduced tone mapping can be selected such that it has a first derivative with a relatively less negative value at log scene luminance −0.4. The value of the first derivative curves of FIG. 2 at log scene luminance −0.4 is shown in Table 1, below. Curves need not be selected solely on the basis of first-derivative value at −0.4; other limits as specified herein, e.g. that at a log scene luminance of −0.6, may be regarded.

We have found through visual judgment experiments that when a highly reflective (mirror-like) display is viewed in a brightly lit environment (e.g. office or showroom environments with >500 lx falling on the face of the display), a higher-contrast tone mapping is required for viewer satisfaction. This finding is surprising and contrary to published literature. The above contrast adjustment can be used in this situation. When a highly reflective display is viewed with a relatively higher amount of ambient light falling on its face, a reproduced tone mapping can be selected such that its first derivative has a relatively more negative value at a log scene luminance −0.4. A reproduced tone mapping can be selected such that its first derivative has a relatively less negative value at log scene luminance −0.4 when the display is viewed with a relatively lower amount of ambient light falling on its face.

TABLE 1

| Curve | Contrast at −0.4 | 1st Derivative Minimum at: |
|---|---|---|
| 130 | −1.16 | −2.13 |
| 150 | −1.26 | −1.96 |
| 110 | −1.19 | −1.73 |
| 120 | −1.09 | −1.82 |
| 140 | −1.29 | −1.54 |

Figure 3:
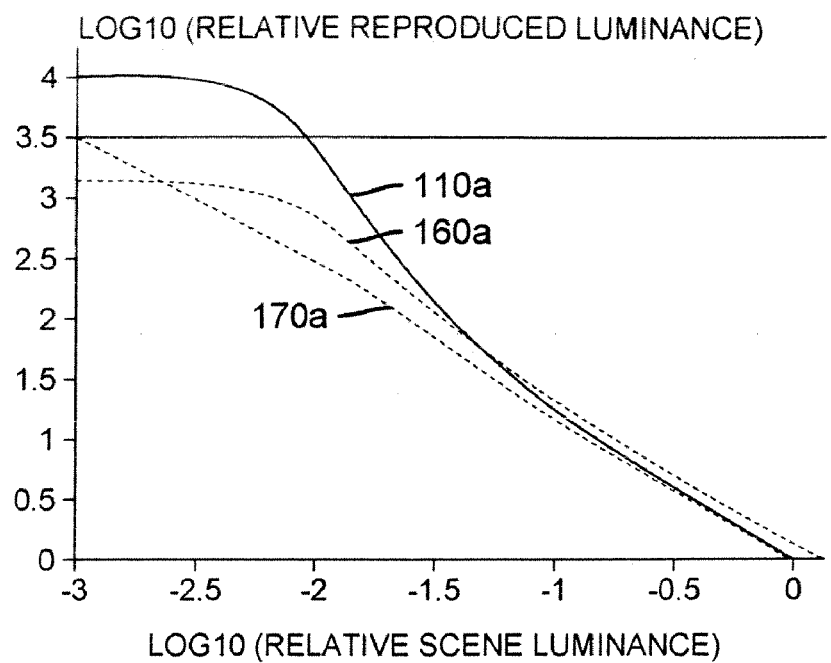
FIG. 3 shows one of the curves of FIG. 1 in comparison with prior-art system tonescale curves.
Figure 4:
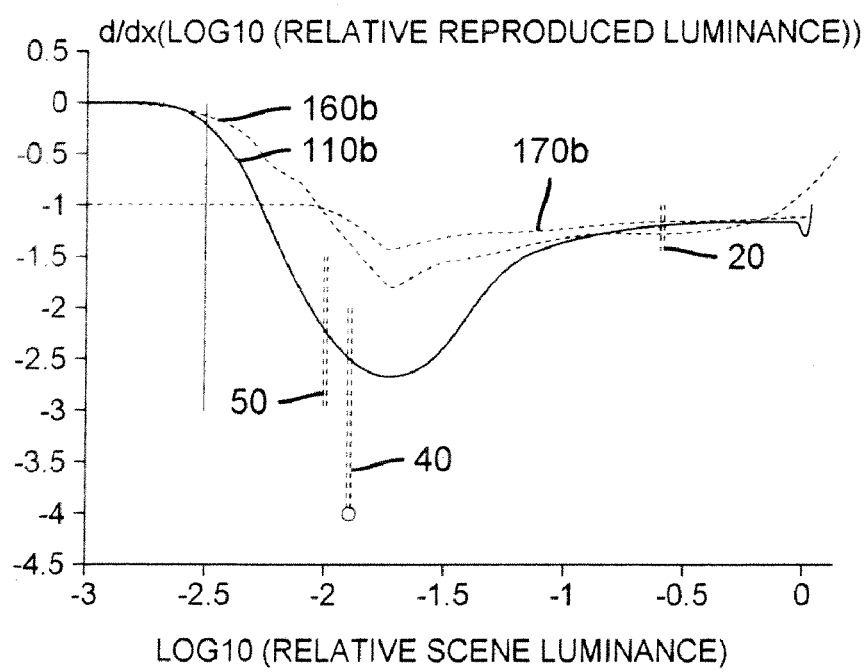
FIG. 4 shows the first derivative of the curves of FIG. 3.

FIG. 3 shows one of the curves of FIG. 1 in comparison with prior-art system tonescale curves, and FIG. 4 shows the first derivative of the curves of FIG. 3. Curve 160a is taught as a system tonescale for self-illuminated displays by Buhr et al. in U.S. Pat. No. 5,447,811, U.S. Pat. No. 5,528,339, and references therein, and curve 160b of FIG. 4 is its first derivative. As can be seen in FIG. 3, its dynamic range of 3.2 decades is insufficient for OLED displays. It also does not meet some of the requirements in FIG. 4, in particular the first derivative values at log scene luminance −1.9 and −2.0.

Curve 170a, the sRGB standard display curve, has been taught as a system tonescale for displays by Stokes et al. above, and curve 170b of FIG. 4 is its first derivative. Curve 170a does have a dynamic range of 3.5 decades, but was defined as nearly a straight line. The first derivative curve 170b does not meet the requirements of FIG. 4 at log scene luminance −1.9 and −2.0. The first derivative curve also has a significantly negative value at log scene luminance −3, which may lead to reproductions perceived as having excess low-end contrast.

Figure 5:
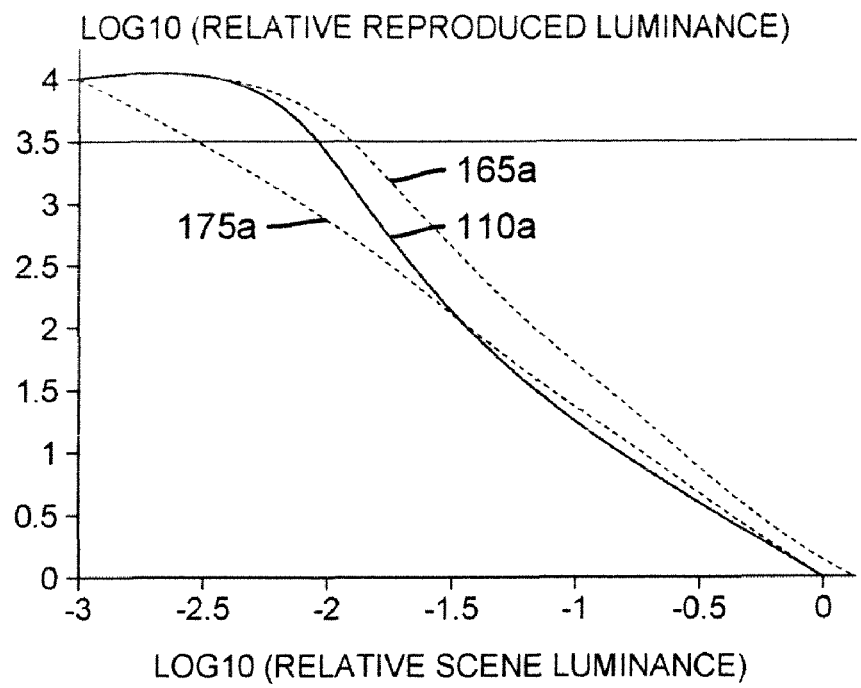
FIG. 5 shows one of the curves of FIG. 1 in comparison with modified prior-art system tonescale curves.
Figure 6:
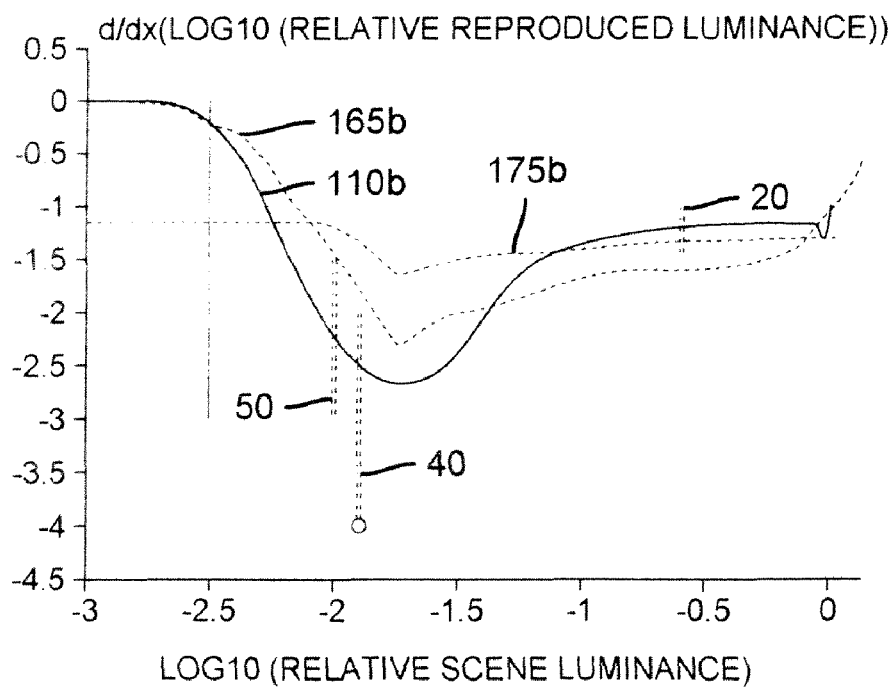
FIG. 6 shows the first derivative of the curves of FIG. 5.

FIG. 5 shows one of the curves of FIG. 1 in comparison with modified prior-art system tonescale curves, and FIG. 6 shows the first derivative of the curves of FIG. 5. Curve 165a is the tonescale of Buhr et al. (Curve 160a in FIG. 3) that has been stretched to a dynamic range of 4 decades by use of a multiplier, and curve 165b is its first derivative. Although it has the required dynamic range, it does not meet many of the requirements in FIG. 6, in particular the first derivative values at log scene luminance −0.6, −1.9, and −2.0. Images having tonescales represented by curve 165a would have a compressed dynamic range, darker reproduced colors, and less detail information, especially in the midscale than reproduced images having tonescales like curve 110a. Curve 175a is the sRGB standard display curve (Curve 170a in FIG. 3) that has been stretched to a dynamic range of 4 decades by use of a multiplier, and curve 175b is its first derivative. Curve 175a does have a dynamic range greater than 3.5 decades, but was defined as nearly a straight line. It does not meet the requirements of FIG. 6 at log scene luminance −1.9 and −2.0. The first derivative curve also has a value less than −0.5 at log scene luminance −3. Images having tonescales represented by curve 175a would look flat and have lifted (i.e. lighter) mid to dark tones relative to images having tonescales defined by this invention.

Figure 7:
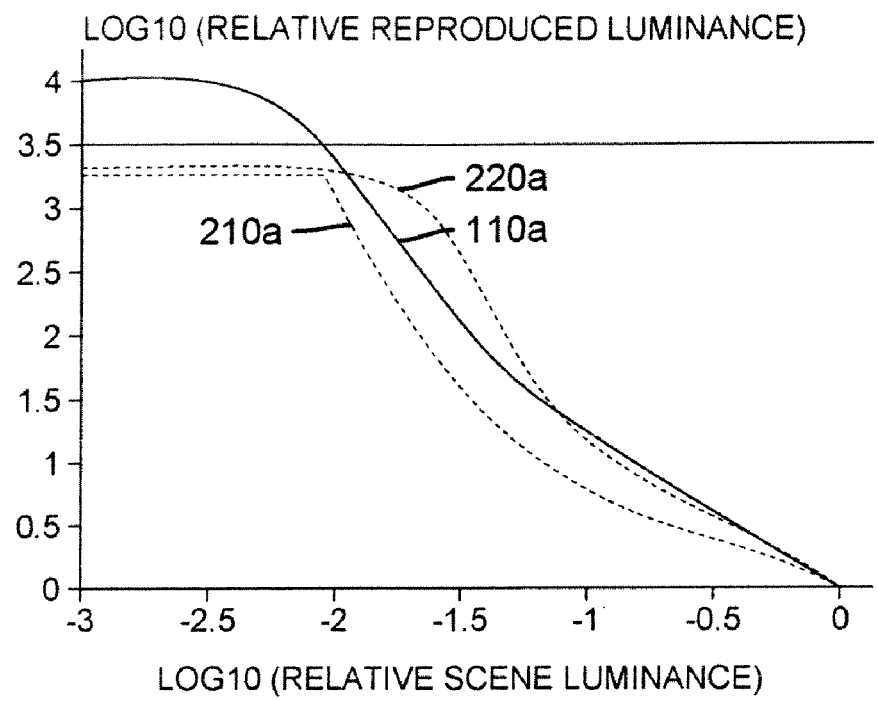
FIG. 7 shows one of the curves of FIG. 1 in comparison with some existing displays.
Figure 8:
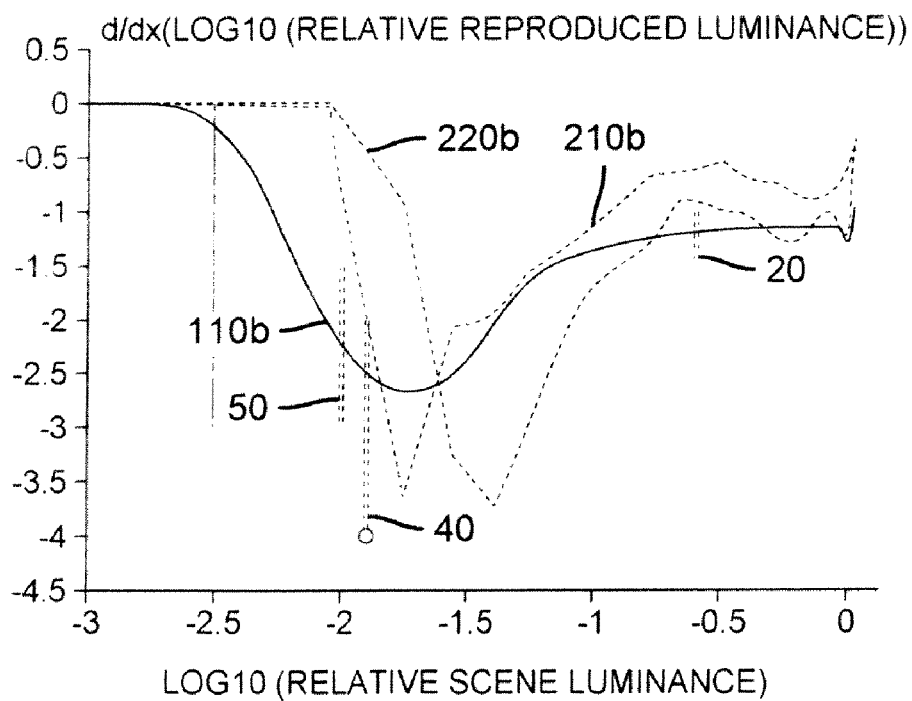
FIG. 8 shows the first derivative of the curves of FIG. 7.

FIG. 7 shows one of the curves of FIG. 1 in comparison with some commercially available displays. FIG. 8 shows the first derivative of the curves of FIG. 7. Curve 210a is for a commercially available plasma display, and Curve 220a is for a commercially available LCD display. Curves 210b and 220b are their respective first derivatives. Neither has the dynamic range necessary to drive a display with greater than 3.5 decades of response. Both curves are also outside many of the first derivative boundaries, as shown in FIG. 8. In particular, both are outside the desired first derivative range at log scene luminances of −0.6 and −2.0. Additionally, curve 220b does not meet the first derivative requirement at −1.9. Images having tonescales represented by curves 210a and 220a would have crushed tonal range from white to black, specifically with lifted blacks and other dark colors, and objectionably low contrast for light colored images areas (i.e. at log scene luminances around −0.6) compared to tonescales defined by this invention. Images having tonescales represented by curve 210a would also be objectionably darker from mid-tones to whites than images having tonescales like curve 110a. Images having tonescales represented by curve 220a would also be objectionably lighter from mid-tones to blacks than images having tonescales like curve 110a.

Figure 9:
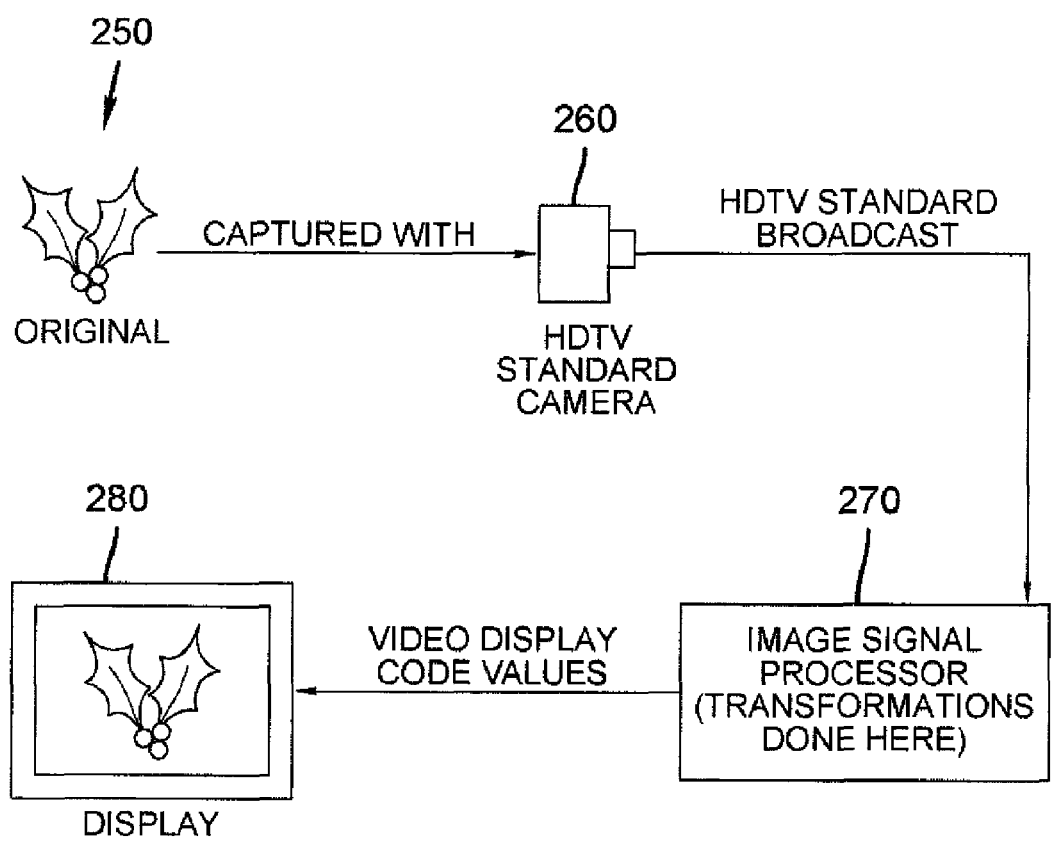
FIG. 9 shows a schematic diagram of an image capture and display process wherein this invention is applicable.

FIG. 9 shows a schematic diagram of the image capture and display method wherein this invention is applicable. In this system, a digital camera 260 can be used to capture original scene parameters from an original scene 250. The captured scene parameters of such a camera comprise digital code values representing scene luminances, e.g. 0 to 255 for each of red, green, and blue luminances. The captured scene parameters can be sent to a display through an image signal processor. Image signal processor 270 performs transformations that comprise modifying the code values of the captured scene parameters. Image signal processor 270 can include any method of performing transformations on the captured scene parameters, e.g. an algorithm, a lookup table, etc. In the displaying step, the modified code values are applied to the display to cause it to emit light corresponding to the modified code values, thus displaying scene reproduction 280, which is a visual reproduction of original scene 250, on the display.

Figure 10:
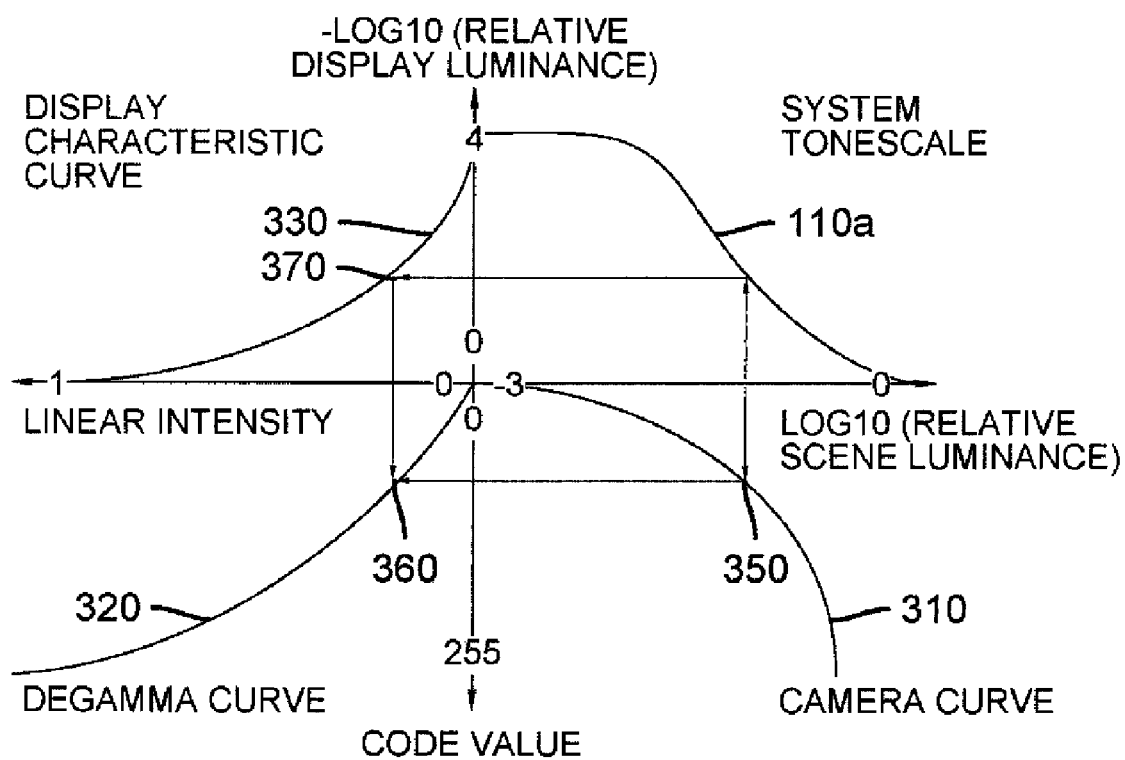
FIG. 10 shows a four-quadrant tone reproduction diagram as used in accordance with this invention.

This process is further shown in FIG. 10, which is a four-quadrant diagram of the image capture, transformation, and display process. Camera curve 310 is the response of the camera to scene luminance. In general, camera curve 310 is a defined standard, e.g. ITU HDTV standard camera curve (Rec. ITU-R BT.709-5 2002, "Parameter values for the HDTV standards for production and international programme exchange," item 1.2). At a given scene luminance, a camera reading 350 on camera curve 310 provides a corresponding digital code value, which is provided (e.g. by broadcasting) to the display. Degamma curve 320 provides the transformation 360 that modifies the code values. The modified code values are thus transformed captured scene parameters. In this embodiment, the modified code values are linear intensity, but other transformations as known in the art can also be used. The modified code values are applied via display characteristic curve 330 to provide a display response 370 such that the display emits light corresponding to the modified code values. Camera curve 310 is set by published standard, and display characteristic curve 330 is determined by the properties of the display. Degamma curve 320 is provided such that the negative log reproduced luminance vs. log scene luminance in the upper right quadrant produces the desired system tonescale curve, e.g. 110a. Thus, the transformation provided by degamma curve 320, taken in conjunction with the untransformed characteristics of the capturing step represented by camera curve 310, and the displaying step represented by display characteristic curve 330, results in the reproduced tone mapping of system tonescale curve 110a.

The degamma curve 320 can be provided by transforming the axes of the desired system tonescale curve 110a through camera curve 310 and display characteristic curve 330. The log scene luminance axis can be transformed to code value by e.g. undoing the log, mapping the resulting scene luminance to voltage through camera curve 320, and mapping the extrema of voltage to extrema of code value, e.g. 0 and 255. The minus log reproduced luminance axis can be transformed to a linear intensity axis e.g. by negating, undoing the log, and normalizing the range of the resulting reproduced luminance to e.g. [0,1]. The resulting map of code value to linear intensity, commonly called a degamma curve, is well-suited for use as the first stage of image signal processor 270. Note that, for any given camera curve and display characteristic, there is a one-to-one correspondence between reproduced tone mappings and degamma curves, and that degamma curves can easily be transformed into reproduced tone mappings by reversing the above procedure.

Existing standards in this area, such as sRGB (IEC 61966-2-1:1999), define the degamma curve rather than the reproduced tone mapping; the reproduced tone mapping shown for sRGB in FIG. 1 is calculated using the Rec. 709 camera characteristic in accordance with 61966-2 Annex B. The degamma curve specified by sRGB (61966-2 eqns. 5 and 6) is monotonically increasing, and is approximately a power function with slope 2.2. This curve is simple to represent mathematically, as it is everywhere concave up. However, as discussed above, it does not provide good image quality for displays or under viewing conditions other than those specified in the standard.

The method of the present invention, since it starts with a reproduced tone mapping and calculates a degamma, is not guaranteed to produce degamma curves with any particular properties. For example, curve 110a changes concavity multiple times but is still monotonically increasing; it is consequently difficult to represent with e.g. a polynomial function. Consequently, an image-processing path can include a lookup table to implement this degamma curve in a straightforward way, without needing to calculate a closed-form expression or other function approximating the degamma curve. This enables the use of tonescales according to the present invention which produce reproductions pleasing to viewers.

The invention has been described in detail with particular reference to certain preferred embodiments thereof, but it will be understood that variations and modifications can be effected within the spirit and scope of the invention.

PARTS LIST 10 black point
15 white point
20 limit
40 limit
50 limit
110a system tonescale curve
110b first derivative curve
120a system tonescale curve
120b first derivative curve
130a system tonescale curve
130b first derivative curve
140a system tonescale curve 140b first derivative curve
150a system tonescale curve
150b first derivative curve
160a system tonescale curve
160b first derivative curve
165a system tonescale curve
165b first derivative curve
170a system tonescale curve
170b first derivative curve
175a system tonescale curve
175b first derivative curve
210a system tonescale curve
210b first derivative curve
220a system tonescale curve
220b first derivative curve
250 original scene
260 camera
270 image signal processor
280 scene reproduction
310 camera curve
320 display degamma curve
330 display response curve
350 camera reading
360 transformation
370 display brightness response

What is claimed is:

1. A method of displaying on a display a visual reproduction of an original scene with a preferential tone mapping; said display having a selected display white point and a selected display black point separated by more than 3.5 decades of luminance; the method comprising the steps of capturing original scene parameters, performing a transformation on said captured scene parameters, and displaying a visual reproduction of the scene on the display from the transformed captured scene parameters; wherein said transformation, taken in conjunction with untransformed characteristics of the capturing and displaying steps, results in a reproduced tone mapping having:
   a. a dynamic range greater than 3.5 decades;
   b. a first derivative value of minus log reproduced luminance relative to log original scene luminance between −1.1 and −1.51 inclusive for a log scene luminance of −0.6, measured relative to a 100% diffuse reflector in the original scene;
   c. a first derivative value less than or equal to −1.9 and greater than −4.0 for a log scene luminance of −1.9;
   d. a first derivative value between −1.5 and −3.0 inclusive for a log scene luminance of −2.0; and
   e. a first derivative value at a log scene luminance of −2.5 is greater than the first derivative value at a log scene luminance of −2.0.

2. The method of claim 1 wherein the reproduced tone mapping has a first derivative value greater than −4.0 for all log scene luminances.

3. The method of claim 2 wherein the reproduced tone mapping has a first derivative value greater than −3 for log scene luminances less than −2.0 and log scene luminances greater than −1.5.

4. The method of claim 1 wherein the display is an OLED, LCD, or plasma display.

5. The method of claim 4 wherein the display is an OLED display.

6. The method of claim 1 wherein the reproduced tone mapping has a first derivative value for a log scene luminance of zero greater than that for a log scene luminance of −0.6.

7. The method of claim 1 wherein the reproduced tone mapping has a first derivative value greater than −0.5 for log scene luminances less than −2.8.

8. The method of claim 1 wherein the first derivative of the reproduced tone mapping is continuous for log scene luminances greater than −3 and less than zero.

9. The method of claim 8 wherein the second derivative of the reproduced tone mapping is continuous for log scene luminances greater than −3 and less than zero.

10. The method of claim 1 wherein the first derivative value for a log scene luminance of −0.6 is between −1.21 and −1.27 inclusive.

11. The method of claim 1 wherein the first derivative value for a log scene luminance of −2.0 is greater than the first derivative value for a log scene luminance of −1.9.

12. The method of claim 1 wherein said captured scene parameters comprise digital code values representing scene luminance, and wherein said transformation comprises modifying those code values.

13. The method of claim 12 wherein the code values are modified in an image-processing path, and wherein said displaying step comprises applying the modified code values to the display to cause it to emit light corresponding to the modified code values.

14. The method of claim 13 wherein the image processing path includes a lookup table.

15. The method of claim 1 wherein the reproduced tone mapping is selected based on characteristics of the display.

16. The method of claim 1 wherein the reproduced tone mapping is selected based on characteristics of a viewing environment.

17. The method of claim 1 wherein the reproduced tone mapping is selected based on characteristics of the original scene.

* * * * *